(12) United States Patent
Ohashi et al.

(10) Patent No.: US 11,632,370 B2
(45) Date of Patent: Apr. 18, 2023

(54) COMMUNICATION DEVICE AND SYSTEM

(71) Applicant: KABUSHIKI KAISHA TOKAI RIKA DENKI SEISAKUSHO, Aichi (JP)

(72) Inventors: Yosuke Ohashi, Aichi (JP); Masateru Furuta, Aichi (JP); Yuki Kono, Aichi (JP); Shigenori Nitta, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 120 days.

(21) Appl. No.: 17/106,552

(22) Filed: Nov. 30, 2020

(65) Prior Publication Data
US 2021/0203659 A1 Jul. 1, 2021

(30) Foreign Application Priority Data
Dec. 26, 2019 (JP) .............................. JP2019-236754

(51) Int. Cl.
*G06F 21/31* (2013.01)
*G06F 21/45* (2013.01)
(Continued)

(52) U.S. Cl.
CPC ...... *H04L 63/0876* (2013.01); *H04L 63/0492* (2013.01); *H04L 63/20* (2013.01); *H04L 67/145* (2013.01)

(58) Field of Classification Search
None
See application file for complete search history.

(56) References Cited

U.S. PATENT DOCUMENTS

2013/0030608 A1\* 1/2013 Taylor .................... B60L 58/26
701/2
2013/0237189 A1\* 9/2013 Nishidai ............... H04W 12/06
455/411

(Continued)

FOREIGN PATENT DOCUMENTS

JP 11-208419 8/1999
JP 2019-169790 A 10/2019

OTHER PUBLICATIONS

In-Vehicle Network Security Using Secure Element. Takemori. IEICE. (Year: 2016).\*

(Continued)

*Primary Examiner* — Venkat Perungavoor
(74) *Attorney, Agent, or Firm* — Greenblum & Bernstein, P.L.C.

(57) ABSTRACT

A communication device provides secure inter-device authentication that ensures certainty of processes. The communication device includes a control section configured to execute a process related to transmission or reception of a first authentication signal and a second authentication signal that are necessary for a first authentication process for authentication between the communication device and another communication device. The control section further controls a second authentication process for different authentication from the first authentication process, and starts a process related to transmission or reception of first information that is necessary for the second authentication process after transmission or reception of the second authentication signal.

12 Claims, 2 Drawing Sheets

(51) Int. Cl.
  *H04L 9/40* (2022.01)
  *H04L 67/145* (2022.01)
  *G06F 21/44* (2013.01)

(56) References Cited

U.S. PATENT DOCUMENTS

| | | | |
|---|---|---|---|
| 2015/0038073 A1* | 2/2015 | Vang | H04W 76/10 |
| | | | 455/41.1 |
| 2016/0145903 A1* | 5/2016 | Taylor | H02J 7/0021 |
| | | | 701/2 |
| 2016/0272154 A1* | 9/2016 | Sanji | B60R 25/24 |
| 2017/0093536 A1* | 3/2017 | Yoganathan | H04W 12/068 |
| 2017/0144630 A1* | 5/2017 | Katou | B60R 25/2018 |
| 2017/0342750 A1* | 11/2017 | Hiramine | B60R 25/245 |
| 2019/0028850 A1* | 1/2019 | Yamaguchi | H04W 4/48 |
| 2019/0051072 A1* | 2/2019 | Okada | H04W 4/40 |
| 2019/0066422 A1* | 2/2019 | Breer | H04W 4/20 |
| 2020/0374122 A1 | 11/2020 | Naiki et al. | |
| 2021/0203659 A1* | 7/2021 | Ohashi | H04L 63/0876 |

OTHER PUBLICATIONS

Design of Wireless Gateway between On-Board Vehicle Wired Networks and Mobile Devices. Aradi. IEEE. (Year: 2014).*

\* cited by examiner

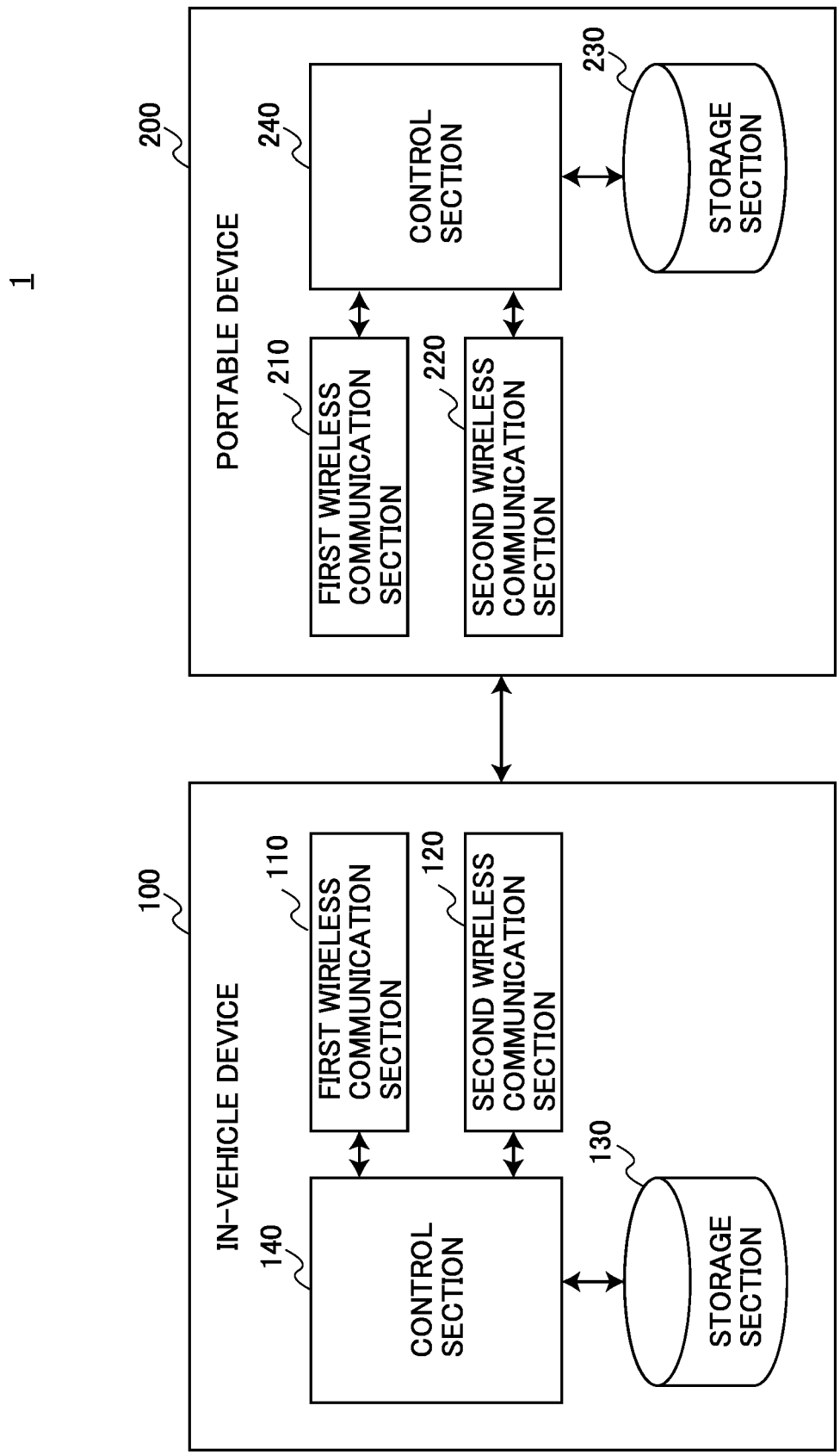

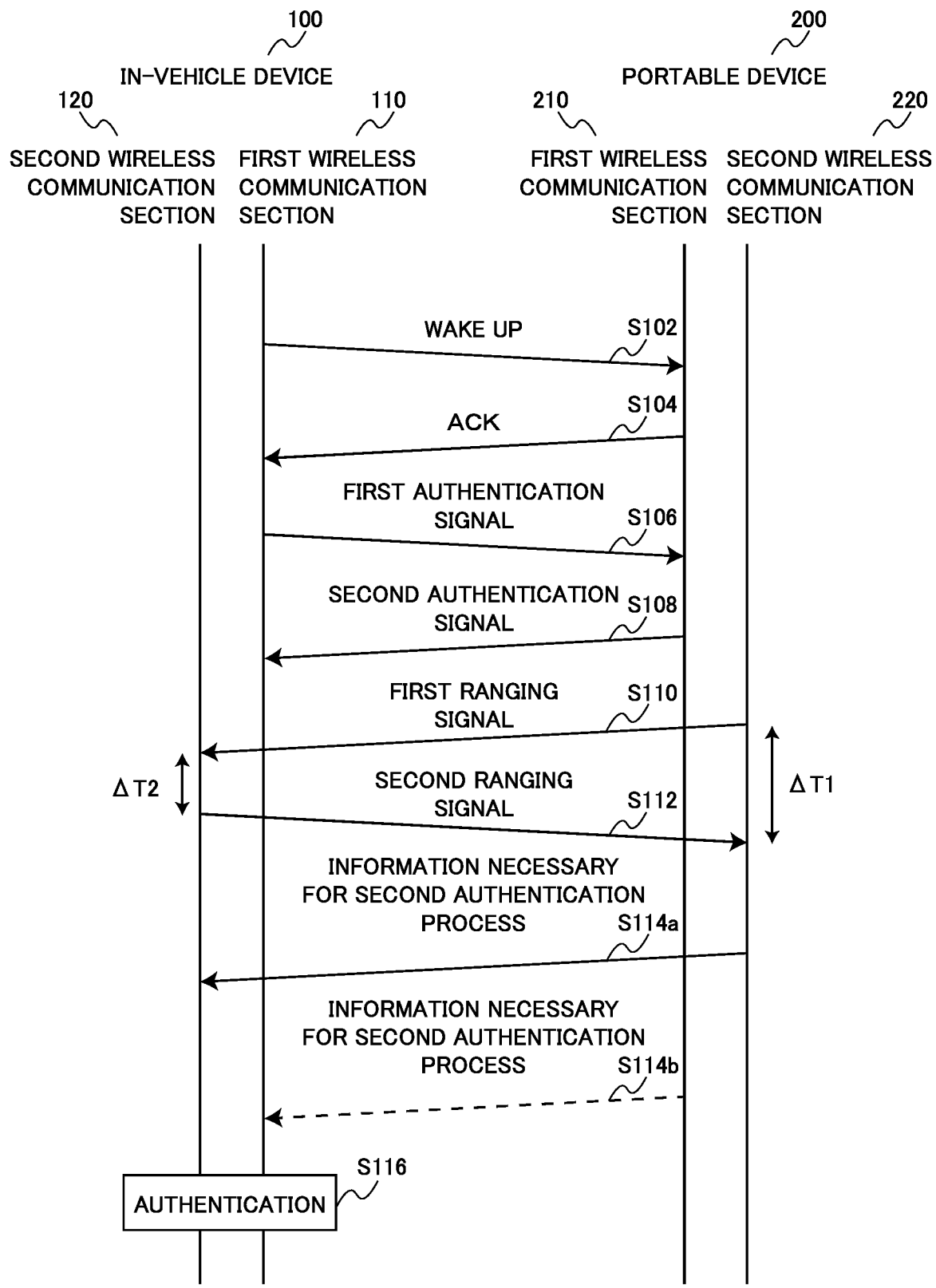

COMMUNICATION DEVICE AND SYSTEM

CROSS REFERENCE TO RELATED APPLICATION(S)

This application is based upon and claims benefit of priority from Japanese Patent Application No. 2019-236754, filed on Dec. 26, 2019, the entire contents of which are incorporated herein by reference.

BACKGROUND

The present invention relates to communication devices and a system.

In recent years, technologies of performing authentication in accordance with a result of transmitting/receiving a signal between devices have been developed. For example, JP H11-208419A discloses a technology of authenticating a portable device by transmitting/receiving a signal between an in-vehicle device and a portable device.

With regard to the above-described inter-device authentication, it is also effective to perform a plurality of different authentication processes to enhance security. However, in the case of performing the plurality of authentication processes, crosstalk between signals may occur.

Accordingly, the present invention is made in view of the aforementioned issues, and an object of the present invention is to achieve inter-device authentication that makes it possible to improve security and ensure certainty of processes.

SUMMARY

To solve the above described problem, according to an aspect of the present invention, there is provided a communication device comprising a control section configured to execute a process related to transmission or reception of a first authentication signal and a second authentication signal that are necessary for a first authentication process for authentication between the communication device and another communication device, wherein the control section further controls a second authentication process for different authentication from the first authentication process, and starts a process related to transmission or reception of first information that is necessary for the second authentication process after transmission or reception of the second authentication signal.

To solve the above described problem, according to another aspect of the present invention, there is provided a communication device comprising a control section configured to control a process related to reception of a first authentication signal and transmission of a second authentication signal that are necessary for a first authentication process for authentication between the communication device and another communication device, wherein the control section further controls a second authentication process for different authentication from the first authentication process, and transmits first information that is necessary for the second authentication process after transmission of the second authentication signal.

To solve the above described problem, according to another aspect of the present invention, there is provided A system comprising: a first communication device; and a second communication device, wherein the first communication device includes a first control section configured to control a process related to transmission of a first authentication signal and reception of a second authentication signal that are necessary for a first authentication process for authentication between the first communication device and the second communication device, the second communication device includes a second control section configured to control a process related to reception of the first authentication signal and transmission of the second authentication signal, and the second control section further controls a second authentication process for different authentication from the first authentication process, and transmits first information that is necessary for the second authentication process after transmission of the second authentication signal.

As described above, according to the present invention, it is possible to achieve the inter-device authentication that makes it possible to improve security and ensure certainty of processes.

BRIEF DESCRIPTION OF THE DRAWINGS

FIG. 1 is a diagram illustrating a configuration example of a system according to an embodiment of the present invention.

FIG. 2 is a sequence diagram illustrating an example of a flow of an authentication process executed by the system according to the embodiment.

DETAILED DESCRIPTION OF THE EMBODIMENT(S)

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. Embodiment

1.1. Overview

First, an overview of an embodiment of the present invention will be described. As described above, in recent years, technologies of performing authentication in accordance with a result of transmitting/receiving a signal between devices have been developed. For example, JP H11-208419A discloses a technology of authenticating a portable device by transmitting/receiving a signal between an in-vehicle device and a portable device. By using such an authentication technology, for example, it is possible to achieve a function of canceling a door lock of a vehicle, a function of starting an engine, and other functions when a user carrying an authenticated portable device enters an area within a predetermined distance from the vehicle.

However, for example, in the case of performing authentication between devices through a request and response scheme using ultra high frequency (UHF) or low frequency (LF), a relay may be used to relay a transmission signal of an in-vehicle device, and communication may be indirectly established between a portable device (authenticatee) and the in-vehicle device. Therefore, a relay attack may be concerned. The relay attack illegally establishes authentication between the in-vehicle device and the portable device. Accordingly, a mechanism capable of preventing the authenticatee impersonation such as the above-described relay attack and further improving authentication accuracy has been desired.

Therefore, the system according to the embodiment of the present disclosure may execute a first authentication process for authentication between communication devices and a second authentication process for different authentication from the first authentication process. As described above, by using the plurality of authentication processes, it is possible to enhance security and prevent authenticatee impersonation or the like as described above.

However, in the case of using wireless signals for the first authentication process and the second authentication process, it is assumed that crosstalk between a wireless signal necessary for the first authentication process and a wireless signal necessary for the second authentication process may occur, and this may deteriorate certainty of the system.

The technical idea according to the embodiment of the present invention was conceived by focusing on the above-described points, and makes it possible to achieve the inter-device authentication capable of improving security and ensuring certainty of processes. Therefore, one of features of the system according to the present embodiment is to separate a timing of transmitting/receiving the wireless signal necessary for the first authentication process from a timing of transmitting/receiving the wireless signal necessary for the second authentication process.

Here, the first authentication process according to the present embodiment may be an authentication process based on a first authentication signal transmitted from one of communication devices and a second authentication signal transmitted from the other communication device in response to the first authentication signal. The first authentication signal and the second authentication signal are signals necessary for first authentication. In the first authentication process according to the present embodiment, it may be determined that authentication between the communication devices has succeeded in the case where a proper second authentication signal corresponding to the first authentication signal is transmitted in response to the first authentication signal.

In this case, the system according to the present embodiment may start a process related to transmission or reception of first information that is necessary for the second authentication process after transmission or reception of the second authentication signal. Here, the process related to transmission of the first information may be a process including generation of a signal to be transmitted via wireless communication sections. In addition, the process related to reception of the first information may be a process including acquisition of a signal received via wireless communication sections. Note that, the acquisition of a signal includes a process such as A/D conversion or reading of data included in a wireless signal. Under such control, the timing of transmitting/receiving a wireless signal necessary for the first authentication is separated from the timing of transmitting/receiving a wireless signal necessary for the second authentication process. This makes it possible to lower the possibility of crosstalk and ensure the certainty of the system.

In addition, communication performed in the first authentication process according to the present embodiment and communication performed in the second authentication process may use different wireless communication standards to more certainly prevent the crosstalk. For example, in the first authentication process according to the present embodiment may be a process of establishing communication between communication devices in conformity with a first wireless communication standard and performing authentication between the communication devices on the basis of a result of the communication. In addition, the second authentication process according to the present embodiment may be a process of establishing communication between the communication devices in conformity with a second wireless communication standard that is different from the first wireless communication standard and performing authentication between the communication devices on the basis of a result of the communication. Such a mechanism makes it possible to ensure the certainty of the system more strongly. Next, details of a configuration example of the system according to the present embodiment will be described.

1.2. Configuration Example

FIG. 1 is a diagram illustrating a configuration example of a system 1 according to the embodiment of the present invention. As illustrated in FIG. 1, the system 1 according to the present embodiment includes an in-vehicle device 100 and a portable device 200. A communication device of an authenticator (also referred to as a first communication device) and a communication device of an authenticatee (also referred to as a second communication device) are involved in the present invention. In an example illustrated in FIG. 1, the in-vehicle device 100 corresponds to an example of the first communication device, and the portable device 200 corresponds to an example of the second communication device. When a user carrying the portable device 100 approaches a vehicle including the in-vehicle device 100, wireless communication for authentication is established between the in-vehicle device 100 and the portable device 200. Here, in the case where the authentication has succeeded, it is possible to unlock the door lock of the vehicle including the in-vehicle device 100 and start the engine. As described above, the system 1 according to the present embodiment may be a smart entry system using wireless communication between communication devices. Next, respective structural elements will be described sequentially.

(In-Vehicle Device 100)

The in-vehicle device 100 may be a communication unit installed in a vehicle that allows the user to get in (for example, a vehicle owned by the user or a vehicle temporarily rented by the user). As illustrated in FIG. 1, the in-vehicle device 100 includes a first wireless communication section 110, a second wireless communication section 120, a storage section 130, and a control section 140.

The first wireless communication section 110 has a function of establishing communication with the portable device 200 in conformity with the first wireless communication standard. In addition, the second wireless communication section 120 has a function of establishing communication with the portable device 200 in conformity with the second wireless communication standard that is different from the first wireless communication standard.

The storage section 130 has a function of storing various kinds of information for operating the in-vehicle device 100. For example, the storage section 130 stores a program for operating the in-vehicle device 100, identification information such as an identifier (ID), key information such as a password, an authentication algorithm, and the like. For example, the storage section 130 includes a storage medium such as flash memory and a processing device that performs recording/playback on/of the storage medium.

The control section 140 has a function of controlling overall operation performed by the in-vehicle device 100. As an example, the control section 140 controls the first wireless communication section 110 and the second wireless communication section 120, communicates with the portable device 200, reads information from the storage section 130, and writes information into the storage section 130. The control section 140 also functions as an authentication control section that controls the authentication process between the in-vehicle device 100 and the portable device 200. For example, the control section 140 includes an electronic circuit such as a central processing unit (CPU) or a microprocessor. Note that, the control section 140 is an example of a first control section that controls operation of the first communication device.

In addition, the control section 140 according to the present embodiment controls a process related to transmission or reception of the first authentication signal and the second authentication signal that are necessary for the first authentication process for authenticating the portable device 200. In addition, the control section 140 according to the present embodiment may further control the second authentication process for different authentication from the first authentication process. At this time, one of features of the control section 140 according to the present embodiment is to start a process related to transmission or reception of the first information that is necessary for the second authentication process after transmission or reception of the second authentication signal.

On the basis of the above-described feature of the control section 140 according to the present embodiment, it is possible to prevent crosstalk between signals necessary for the first authentication process and the second authentication process between the in-vehicle device 100 and the portable device 200, improve security, and ensure the certainty of the processes.

As an example, the first authentication process according to the present embodiment may be request response authentication. Here, the request response authentication is a method in which an authenticator generates an authentication request and transmits the generated authentication request to an authenticatee, the authenticatee generates an authentication response on the basis of the authentication request and transmits the generated authentication response to the authenticator, and the authenticator authenticates the authenticatee on the basis of the authentication response. In other words, the first authentication signal according to the present embodiment corresponds to the authentication request. In addition, the second authentication signal according to the present embodiment corresponds to the authentication response. Examples of the authentication request and the authentication response include a request for a preset password, and a password or the like transmitted in response to the request. In addition, the authentication request and the authentication response may use a one-time password. In this case, for example, the authentication request may be a random number generated each time. The authenticatee performs computation by using a prescribed algorithm in addition to authenticatee information (such as the password) and a random number transmitted as the authentication request, and transmits a result of the computation to the authenticator as the authentication response. The authenticator performs computation by using a prescribed algorithm in addition to the transmitted authentication request and the stored authenticatee information regarding the authenticatee, and compares a result of the computation and the received authentication response. Here, in the case where the result of the computation and the received authentication response match each other, the authenticatee may determine that the authentication of the authenticatee has succeeded.

As described above, it can be said that the first authentication process according to the present embodiment is a process in which the authenticatee generates and transmits a solution on the basis of some kind of information transmitted from the authenticator, and the authenticator authenticates the authenticatee on the basis of the solution. As an example, in response to the first authentication signal transmitted from the first communication device as the authentication request, the second communication device transmits the second authentication signal as the authentication response. The second authentication signal is a signal computed on the basis of the first authentication signal and the authenticatee information such as a prestored password. Here, in the case where the second authentication signal transmitted as the authentication response is admitted as a signal indicating a proper value calculated from the key information and the first authentication signal serving as the authentication request, the control section 140 may determine that the authentication between the first communication device and the second communication device has succeeded.

Note that, the first wireless communication standard according to the present embodiment may satisfy at least any of a requirement that the first wireless communication standard achieves higher gain than the second wireless communication standard and a requirement that the first wireless communication standard achieves lower power consumption on a receiver side than the second wireless communication standard. As a specific example that satisfies such a requirement, the second wireless communication standard may use a carrier wave of higher frequency than frequency of a carrier wave used under the first wireless communication standard.

As the frequency of the carrier wave gets higher, attenuation based on distance get larger and the gain gets reduced. As the frequency of the carrier wave gets lower, attenuation based on distance get smaller and the gain gets increased. Accordingly, the above-described requirement related to the gain is satisfied. In addition, sampling frequency on the receiver side increases as a carrier wave has a higher frequency. This results in increase in amount of electric power to be consumed by the receiver. Sampling frequency on the receiver side decreases as a carrier wave has a lower frequency. This results in decrease in amount of electric power to be consumed by the receiver. This satisfies the above-described requirement regarding electric power consumption on the receiver side. Note that, considering that sampling frequency is set depending on a maximum value of frequency of the carrier wave, it is sufficient to satisfy at least a requirement that maximum frequency of the carrier wave based on the second wireless communication standard is higher than maximum frequency of the carrier wave based on the first wireless communication standard.

For example, the first wireless communication standard according to the present embodiment may use an LF band signal and a UHF band signal. In this case, the first communication device may use the LF band signal to transmit the first authentication signal, and the second communication device may use the UHF band signal to transmit the second authentication signal. As described above, the first authentication process according to the present embodiment may be request response authentication using the LF band signal and the UHF band signal.

On the other hand, the control section 140 executes, as the second authentication process, a process including a process of authenticating the second communication device on the basis of a distance between the first communication device and the second communication device. For example, the second authentication process according to the present embodiment may include a ranging process of measuring the distance between the first communication device and the second communication device, and a process of performing authentication on the basis of second information acquired by executing the ranging process. At this time, the control section 140 may determine that the second authentication process has succeeded in the case where the distance between the first communication device and the second communication device, which is measured through the ranging process, is determined to be a prescribed distance or less on the basis of the second information.

In other words, the system 1 according to the present embodiment performs the first authentication process using the first authentication signal and the second authentication signal and the second authentication process based on the distance between the first communication device and the second communication device. This makes it possible to prevent authenticatee impersonation and distance falsification like the relay attack, and it is possible to efficiently improve authentication accuracy as a whole.

Note that, the ranging process in the second authentication process according to the present embodiment is executed on the basis of transmission and reception of ranging signals. The ranging signals according to the present embodiment are signals used for measuring the distance between the first communication device and the second communication device according to the present embodiment (more precisely, a distance between wireless communication sections for transmitting/receiving the ranging signals). The ranging signals are wirelessly transmitted and received between the first communication device and the second communication device. For example, the ranging process according to the present embodiment may include transmission of a first ranging signal to one of the first communication device and the second communication device, reception of a second ranging signal from the other of the first communication device and the second communication device in response to the first ranging signal, and calculation of a ranging value on the basis of time taken to transmit and receive the first ranging signal and the second ranging signal.

The first ranging signal and the second ranging signal may be transmitted and received in conformity with the second wireless communication standard. As an example, the second wireless communication standard according to the present embodiment may use a signal of ultra-wideband (UWB) frequency. An UWB impulse signal has a property that makes it possible to perform positioning and ranging with high accuracy. In other words, it is possible to measure air propagation time of a radio wave with high accuracy by using the radio wave of ultra-short pulse width of nanosecond or less, and it is possible to perform positioning and ranging with high accuracy on the basis of the propagation time.

(Portable Device 200)

The portable device 200 may be any device to be carried by the user. Examples of the any device include an electronic key, a smartphone, a wearable terminal, and the like. As illustrated in FIG. 1, the portable device 200 includes a first wireless communication section 210, a second wireless communication section 220, a storage section 230, and a control section 240.

The first wireless communication section 210 has a function of establishing communication with the in-vehicle device 100 in conformity with the first wireless communication standard. In addition, the second wireless communication section 220 has a function of establishing communication with the in-vehicle device 100 in conformity with the second wireless communication standard.

The storage section 230 has a function of storing various kinds of information for operating the portable device 200. For example, the storage section 230 stores a program for operating the portable device 200, identification information such as an ID, key information such as a password, an authentication algorithm, and the like. For example, the storage section 130 includes a storage medium such as flash memory and a processing device that performs recording/playback on/of the storage medium.

The control section 240 has a function of controlling overall operation performed by the portable device 200. As an example, the control section 240 controls the first wireless communication section 210 and the second wireless communication section 220, communicates with the in-vehicle device 100, reads information from the storage section 230, and writes information into the storage section 230. The control section 240 also functions as an authentication control section that controls the authentication process between the in-vehicle device 100 and the portable device 200. For example, the control section 240 may include an electronic circuit such as a CPU or a microprocessor. Note that, the control section 240 is an example of a second control section that controls operation of the second communication device.

In addition, one of features of the control section 240 according to the present embodiment is to control a process related to reception of the first authentication signal and transmission of the second authentication signal that are necessary for the first authentication process, and transmit the first information that is necessary for the second authentication process after transmission of the second authentication process.

The configuration example of the system 1 according to the present embodiment has been described above. Note that, the configuration described above with reference to FIG. 1 is a mere example. The configuration of the system 1 according to the present embodiment is not limited thereto. For example, FIG. 1 illustrates the case where the control section 140 controls the first wireless communication section 110 and the second wireless communication section 120. On the other hand, the above-described function of the control section 140 may be achieved by cooperation of the first wireless communication section 110 and the second wireless communication section 120. The same applies to the function of the control section 240. The configuration of the system 1 according to the present embodiment may be flexibly modified in accordance with specifications and operations.

1.3. Details

Next, details of the authentication process performed by the system 1 according to the present embodiment will be described. As described above, the system 1 according to the present embodiment executes the first authentication process and the second authentication process. In addition, the system 1 determines that the authentication between the first communication device and the second communication device has succeeded only in the case where both the first authentication process and the second authentication process satisfy conditions. Under such control, it is possible to perform more secure inter-device authentication in comparison with request response authentication or the like based on communication in conformity with a single wireless communication standard.

In addition, the control section 140 according to the present embodiment causes the first wireless communication section 110 to transmit the first authentication signal, and executes the first authentication process on the basis of the transmitted first authentication signal and the second authentication signal transmitted from the second communication device that has received the first authentication signal in response to the first authentication signal. At this time, one of features of the control section 140 according to the present embodiment is to start a process related to transmission or reception of the first information that is necessary for the second authentication process after transmission or reception of the second authentication signal that is necessary for the first authentication process.

For example, after reception of the second authentication signal transmitted from the portable device 200, the control section 140 of the in-vehicle device 100 according to the present embodiment may further receive the first information that is necessary for the second authentication process, and execute the second authentication process by using the first information. Under such control, it is possible to prevent crosstalk between signals necessary for the first authentication process and the second authentication process, improve security, and ensure the certainty of the processes.

Note that, to more certainly prevent the above-described crosstalk between signals, the first authentication process according to the present embodiment may transmit and receive signals in conformity with the first wireless communication standard, and the second authentication process may transmit and receive signals in conformity with the second wireless communication standard that uses carrier waves of higher frequency than frequency of carrier waves used under the first wireless communication standard.

In addition, as described above, the second authentication process according to the present embodiment may include a ranging process of measuring the distance between the first communication device and the second communication device, and a process of performing authentication on the basis of the second information acquired by executing the ranging process. For example, the control section 140 according to the present embodiment may determine that the second authentication process has succeeded in the case where the distance between the first communication device and the second communication device is determined to be a prescribed distance or less on the basis of the second information. Under such control, it is possible to prevent authenticatee impersonation and distance falsification like the relay attack, and it is possible to efficiently improve authentication accuracy as a whole.

Next, with reference to FIG. 2, details of a flow of the authentication process executed by the system 1 according to the present embodiment will be described. FIG. 2 is a sequence diagram illustrating an example of the flow of the authentication process performed by the system 1 according to the present embodiment. Note that, FIG. 2 illustrates an example in which the in-vehicle device 100 is the first communication device according to the present embodiment and the portable device 200 is the second communication device. The first wireless communication section 110 of the in-vehicle device 100 and the first wireless communication section 210 of the portable device 200 perform communication in conformity with UHF/LF as the first wireless communication standard, and the second wireless communication section 120 and the second wireless communication section 220 perform communication in conformity with UWB as the second wireless communication standard.

In addition, FIG. 2 illustrates the control example in which the first authentication process is request response authentication based on the first authentication signal (authentication request) and the second authentication signal (authentication response), and the second authentication process is an authentication process based on ranging.

Next, the flow of the authentication process will be described with reference to FIG. 2. The first authentication process according to the present embodiment may include transmission of a wake-up signal by the first communication device. The wake-up signal is a signal for instructing to activate another communication device.

In the case of the example illustrated in FIG. 2, the first wireless communication section 110 of the in-vehicle device 100 first transmits the wake-up signal (S102). The first wireless communication section 110 of the in-vehicle device 100 may transmit the wake-up signal while limiting a receiver to the first wireless communication section 210 of the portable device or without limiting the receiver. The first wireless communication section 210 of the portable device 200 that has received the wake-up signal from the first wireless communication section 110 of the in-vehicle device 100 transmits an acknowledgement (ACK) signal in response to the wake-up signal (S104). The ACK signal indicates activation. Note that, in the case where it is difficult to activate the portable device 200, the first wireless communication section 210 of the portable device 200 may transmit a negative-acknowledgement (NACK) signal indicating non-activation.

Under such control, it is possible for the first communication device to control whether or not to start the authentication process in accordance with a response to the wake-up signal from the second communication device, and it is possible to avoid continuous transmission of the first authentication signal or the like in a situation where it is difficult to activate the second communication device. On the other hand, it is not always necessary to transmit the wake-up signal or a response thereto.

Next, the first wireless communication section 100 of the in-vehicle device 100 transmits the first authentication signal (S106). As described above, the first authentication process according to the present embodiment may be request response authentication. In this case, the first authentication signal may be the authentication request. Note that, the first wireless communication section 110 of the in-vehicle device 100 may transmit the first authentication signal while limiting a receiver to the first wireless communication section 210 of the portable device or without limiting the receiver. In the latter case, all portable devices 200 that have received the first authentication signal may return the second authentication signal. In this case, the second authentication signal may include information for identifying a transmitter.

After the first wireless communication section 210 receives the first authentication signal, the control section 240 of the portable device 200 causes the first wireless communication section 210 to transmit the second authentication signal (authentication response) in response to the first authentication signal (authentication request) (S108).

Next, the control section 240 of the portable device 200 causes the second wireless communication section 220 to transmit the first ranging signal (S110). As described above, the second authentication process according to the present embodiment may be started when the second communication device transmits the second ranging signal after transmission of the authentication response in response to the authentication request transmitted from the first communication device. Under such control, it is possible to completely separate the timing of transmitting/receiving the signals related to the first authentication process from the timing of transmitting/receiving the signals related to the second authentication process, and it is possible to more certainly prevent crosstalk between the signals.

On the other hand, the timing of starting the second authentication process according to the present embodiment is not limited to the above-described example. The second authentication process according to the present embodiment may be started by transmitting the first ranging signal (S110) after the second communication device receives the wake-up signal (after Step S102). Under such control, the effect of preventing the crosstalk is also expected.

When the second wireless communication section 120 receives the first ranging signal in Step S110, the control section 140 of the in-vehicle device 100 causes the second wireless communication section 120 to transmit the second ranging signal in response to the first ranging signal (S112).

When the second wireless communication section 220 receives the second ranging signal in Step S112, the control section 240 of the portable device 200 controls transmission of information to the in-vehicle device 100. The information is necessary for the second authentication process.

For example, the control section 240 causes the second wireless communication section 220 to transmit the first information necessary for the second authentication process (S114a). However, the transmitter of the first information is not limited to the second wireless communication section 220, the transmitter of the first information may be the first wireless communication section 210 (S114b).

Note that, the first information according to the present embodiment includes various kinds of information necessary for the first communication device serving as the authenticator to determine validity of the second communication device serving as the authenticatee. For example, in the case where the second authentication process according to the embodiment includes the ranging process, a piece of the first information may include the second information acquired by executing the ranging process.

More specifically, the second information includes various kinds of information that makes it possible for the in-vehicle device 100 to determine whether or not the distance between the in-vehicle device 100 and the portable device 200 is a prescribed distance or less. For example, the second information includes a ranging value indicating the distance between the first communication device and the second communication device, information indicating whether or not the ranging value is the prescribed distance or less, a parameter for calculating the ranging value, or the like.

The ranging value indicating the distance between the in-vehicle device 100 and the portable device 200 is calculated on the basis of a time period $\Delta T1$ from time when the portable device 200 transmits the first ranging signal to time when the portable device 200 receives the first ranging signal from the in-vehicle device 100, and a time period $\Delta T2$ from time when the in-vehicle device 100 receives the first ranging signal to time when the in-vehicle device 100 transmits the second ranging signal.

More specifically, time taken to perform two-way communication of the ranging signals is calculated by subtracting $\Delta T2$ from $\Delta T1$, and time taken to perform one-way communication of a ranging signal is calculated by dividing the calculated time by 2. In addition, by multiplying the value obtained through $(\Delta T1-\Delta T2)/2$ by speed of the signal, it is possible to calculate the ranging value indicating the distance between the in-vehicle device 100 and the portable device 200.

Therefore, for example, in the case where the in-vehicle device 100 transmits the second ranging signal including the $\Delta T2$ value, the portable device 200 may calculate the ranging value from the $\Delta T2$ value included in the received second ranging signal and the $\Delta T1$ value calculated by the portable device 200 itself, and may transmit information including the ranging value to the in-vehicle device 100 as a piece of the first information (second information). In addition, the portable device 200 may determine whether or not the calculated ranging value is the prescribed distance or less, and transmit information indicating a result of the determination as a piece of the first information (second information).

On the other hand, the portable device 200 may transmit information including the calculated $\Delta T1$ value as a piece of the first information (second information). In this case, the in-vehicle device 100 is capable of calculating a ranging value from the $\Delta T1$ value included in the received information and the $\Delta T2$ value calculated by the in-vehicle device 100 itself. In addition, the portable device 200 may transmit, as a piece of the first information (second information), time when the first ranging signal is received in Step S110 and time when the second ranging signal is transmitted in Step S112. In this case, the in-vehicle device 100 is capable of calculating $\Delta T1$ from the two clock times and calculating a ranging value. Note that, the $\Delta T2$ value may be a fixed value shared in advance between the in-vehicle device 100 and the portable device 200. As described above, the second information according to the present embodiment includes $\Delta T1$, $\Delta T2$, or various kinds of information for calculating $\Delta T1$ and $\Delta T2$. In addition, the second information may be a piece of the first information necessary for the second authentication process.

Next, the control section 140 of the in-vehicle device 100 according to the present embodiment makes a determination related to the second authentication process on the basis of the received first information that is necessary for the second authentication process, and performs authentication between the in-vehicle device 100 and the portable device 200 (S116). Note that, the control section 140 may make a determination related to the first authentication process in Step S116, or at any timing after the second authentication signal is received in Step S108.

2. Supplement

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

For example, in the above-described embodiment, the example in which the in-vehicle device 100 is the first communication device serving as the authenticator and the portable device 200 is the second communication device serving as the authenticatee has been described. However, the present invention is not limited thereto. The roles of the in-vehicle device 100 and the portable device 200 may be reversed, or the roles may be switched dynamically. In addition, the ranging process and the authentication process may be performed between the in-vehicle devices 100.

In addition, for example, although the example in which the present invention is applied to the smart entry system has been described in the above embodiment, the present invention is not limited thereto. The present invention is applicable to any system that performs the ranging and authentication by transmitting/receiving signals. For example, the present invention is applicable to a pair of any two devices selected from a group including portable devices, vehicles, smartphones, drones, buildings, home appliances, and the like. Note that, the pair may include two device of a same type, or may include two different types of devices. In this case, one of the devices operates as the first communication device and the other device operates as the second communication device.

In addition, for example, in the above embodiment, the standard using UHF/LF has been exemplified as the first wireless communication standard, and the standard using UWB has been exemplified as the second wireless communication standard. However, the present invention is not limited thereto. For example, it is also possible to use Wi-Fi (registered trademark), Bluetooth (registered trademark), or the like as the first wireless communication standard. In addition, for example, it is also possible to use a standard using infrared as the second wireless communication standard.

In addition, for example, although the above embodiment has been described on the assumption that the in-vehicle device 100 performs the authentication based on the request and response, the calculation of a distance based on $\Delta T1$ and $\Delta T2$, and the authentication based on the distance, the present invention is not limited thereto.

Note that, the series of processes performed by the devices described in this specification may be achieved by any of software, hardware, and a combination of software and hardware. A program that configures software is stored in advance in, for example, a recording medium (non-transitory medium) installed inside or outside the devices. In addition, for example, when a computer executes the programs, the programs are read into RAM, and executed by a processor such as a CPU. The recording medium may be a magnetic disk, an optical disc, a magneto-optical disc, flash memory, or the like, for example. Alternatively, the above-described computer program may be distributed via a network without using the recording medium, for example.

Further, in the present specification, the processes described using the sequence diagram are not necessarily executed in the order illustrated in the drawing. Some processing steps may be executed in parallel. In addition, additional processing steps may be employed and some processing steps may be omitted.

REFERENCE SIGNS LIST 1 system
100 in-vehicle device
110 first wireless communication section
120 second wireless communication section
130 storage section
140 control section
200 portable device
210 first wireless communication section
220 second wireless communication section
230 storage section
240 control section

What is claimed is:

1. A communication device, comprising:
a controller configured to execute a process related to transmission or reception of a first authentication signal and a second authentication signal that are necessary for a first authentication process for authentication between the communication device and another communication device; and
a storage,
wherein the controller further
controls a second authentication process for different authentication from the first authentication process, and
starts a process related to transmission or reception of first information that is necessary for the second authentication process after transmission or reception of the second authentication signal,
wherein in the first authentication process, signals are transmitted and received in conformity with a first wireless communication standard, and
wherein in the second authentication process, signals are transmitted and received in conformity with a second wireless communication standard that uses a carrier wave of higher frequency than frequency of a carrier wave used under the first wireless communication standard.

2. The communication device according to claim 1,
wherein the first authentication process is an authentication process based on the first authentication signal transmitted from the communication device and the second authentication signal transmitted from the another communication device in response to the first authentication signal, and
after reception of the second authentication signal, the controller further receives the first information and executes the second authentication process.

3. The communication device according to claim 1,
wherein the second authentication process includes a ranging process of measuring a distance between the communication device and the another communication device, and a process of performing authentication on a basis of second information acquired by executing the ranging process.

4. The communication device according to claim 3,
wherein the controller determines that the second authentication process has succeeded in a case where the distance between the communication device and the another communication device is determined to be a prescribed distance or less on a basis of the second information.

5. The communication device according to claim 4,
wherein the second information includes at least one of a ranging value of the distance to the another communication device, a parameter for calculating the ranging value, and information indicating whether or not the ranging value is the prescribed distance or less.

6. The communication device according to claim 3,
wherein the controller starts a process related to transmission or reception of the first information while treating the second information as a piece of the first information.

7. The communication device according to claim 5,
wherein the ranging process includes transmission of a first ranging signal to one of the another communication device and the communication device, reception of a second ranging signal from the other of the another communication device and the communication device in response to the first ranging signal, and calculation of the ranging value on a basis of time taken to transmit and receive the first ranging signal and the second ranging signal.

8. The communication device according to claim 7, wherein the controller executes a process including transmission of a wake-up signal for activating the other communication device as the first authentication process, and execution of the second authentication process is started when the first ranging signal is transmitted after the other communication device receives the wake-up signal.

9. The communication device according to claim 3, wherein the first authentication process includes request response authentication based on an authentication request for requesting transmission of a solution and an authentication response generated as the solution by using the authentication request, the second authentication process is started when a first ranging signal is transmitted after the another communication device transmits the authentication response in response to the authentication request, and the controller executes the second authentication process on a basis of the second information transmitted from the another communication device.

10. The communication device according to claim 1, wherein the communication device is installed in a vehicle, and the another communication device is installed in a portable device.

11. A communication device, comprising:

a controller configured to control a process related to reception of a first authentication signal and transmission of a second authentication signal that are necessary for a first authentication process for authentication between the communication device and another communication device; and a storage, wherein the controller further controls a second authentication process for different authentication from the first authentication process, and transmits first information that is necessary for the second authentication process after transmission of the second authentication signal, wherein in the first authentication process, signals are transmitted and received in conformity with a first wireless communication standard, and wherein in the second authentication process, signals are transmitted and received in conformity with a second wireless communication standard that uses a carrier wave of higher frequency than frequency of a carrier wave used under the first wireless communication standard.

12. A system, comprising:

a first communication device; and a second communication device, wherein the first communication device includes a first controller configured to control a process related to transmission of a first authentication signal and reception of a second authentication signal that are necessary for a first authentication process for authentication between the first communication device and the second communication device, the second communication device includes a second controller configured to control a process related to reception of the first authentication signal and transmission of the second authentication signal, and the second controller further controls a second authentication process for different authentication from the first authentication process, and transmits first information that is necessary for the second authentication process after transmission of the second authentication signal, wherein in the first authentication process, signals are transmitted and received in conformity with a first wireless communication standard, and wherein in the second authentication process, signals are transmitted and received in conformity with a second wireless communication standard that uses a carrier wave of higher frequency than frequency of a carrier wave used under the first wireless communication standard.

* * * * *